United States Patent [19]
Schlegel

[11] Patent Number: 5,333,525
[45] Date of Patent: Aug. 2, 1994

[54] APPARATUS AND METHOD FOR PRODUCING MOTOR LAMINATIONS FROM A BLANK

[75] Inventor: Mark D. Schlegel, Erie, Pa.

[73] Assignee: General Electric Company, Erie, Pa.

[21] Appl. No.: 894,401

[22] Filed: Jun. 5, 1992

[51] Int. Cl.[5] .............................................. B26D 3/14
[52] U.S. Cl. ........................................ 83/23; 29/596; 83/154; 83/267; 83/917
[58] Field of Search ................ 83/410.7, 411.6, 267, 83/406, 917, 23, 154; 414/751, 752; 29/596, 609, 738

[56] References Cited

U.S. PATENT DOCUMENTS

| | | | |
|---|---|---|---|
| 1,031,694 | 7/1912 | Deats | 83/410.7 X |
| 3,460,415 | 8/1969 | Phillipp | 83/267 X |
| 4,197,772 | 4/1980 | Anderson et al. | 83/63 |
| 4,331,049 | 5/1982 | Bergmann et al. | 83/267 X |
| 4,703,678 | 11/1987 | Kivchi | 83/917 X |

OTHER PUBLICATIONS

Sales brochure entitled "Product Portfolio, Weingarten Division", *Muller Weingarten Corporation*, Rochester, Mich., publication date unknown, pp. 1-35, (pertinent pp. 8-9).
Sales brochure entitled "Notching Machines and Automats Segment Notching and Blank Cutting Lines", *Schuller Presses*, Columbus, Ohio, publication date unknown, pp. 1-31.

Primary Examiner—Richard K. Seidel
Assistant Examiner—Kenneth E. Peterson
Attorney, Agent, or Firm—R. Thomas Payne; Marvin Snyder

[57] ABSTRACT

An apparatus and method for producing motor laminations from blanks uses a servo-controlled linear transport mechanism for transporting blanks a fixed stroke distance to a notching station wherein the notching station includes a stationary index spindle and movable punch head which adjusts for accommodating blanks of varying diameters. A lamination removal mechanism removes and transfers a notched lamination from the notching station to a lamination carrier by traveling a fixed stroke distance. Different diameter blanks are facilitated by adjusting grippers and the punch head while the stroke distances remain unchanged. The linear transport mechanism and the lamination removal mechanism move independently to transfer blanks and laminations at different times to improve blank throughput.

37 Claims, 7 Drawing Sheets

APPARATUS AND METHOD FOR PRODUCING MOTOR LAMINATIONS FROM A BLANK

BACKGROUND OF THE INVENTION

The invention relates generally to notching or punching systems, and more particularly to automatic notching systems for producing rotor and/or stator laminations from blanks.

Known high speed notching systems for notching slots in blanks, such as circular blanks, to form D.C. motor armatures and/or A.C. rotors, typically require numerous costly and time consuming changeover/set-up operations to properly adjust the notching system each time a different diameter blank is notched. The changeover/set-up costs drastically increase and become prohibitive with conventional notching systems particularly for producers specializing in custom designed A.C. and/or D.C. motors.

Such custom lamination producers must typically produce numerous low volume production lots where each production lot requires the notching of a different diameter blank. Therefore, changeover/set-up operations must be performed more often which results in prohibitive cost increases stemming from substantial machine down time which reduces production capacity and increases labor time dedicated to the change-over/-set up operations.

One known type of conventional high speed automatic lamination producing machine uses gear driven arms that are fixedly connected so that both arms move simultaneously during blank actuation. An example of such a machine may be a V&O model 410, manufactured by V&O Press Company, New York. Generally, a blank is removed by one arm from a pre-process mandrel, which contains a stack of blanks, while another fixed arm removes notched blank (lamination) from the notch press and places the blank on a post-process mandrel or carrier. The machine changeover required for different sized blanks is typically started by moving the index spindle of the notch press laterally either in or out relative to the notch press punch and die. Because of this, there is a requirement to re-position both the pre-process mandrel and the post-process mandrels thereby necessitating a stroke adjustment for the arms. Such changeover operations may take as long as 4–5 hours depending on the blank diameter and other factors.

Another type of high speed lamination producing machine utilizes a notch press which requires the index spindle to be adjusted for varying diameter blanks but uses a servo actuated, linear feed mechanism for transporting the blank to the notch press. The index spindle does not retract but remains longitudinally fixed with respect to the laterally adjustable index spindle. A longitudinally movable blank support plate raises to remove the lamination. A simple air cylinder then ejects the lamination from the index spindle to a random location to the side of the machine. An example of the notch press used by such a machine may be a Weingarten model NK 8, manufactured by Muller Weingarten Corporation, Germany.

As with the previously discussed system, a similar problem arises since changeover for a blank of a different size typically requires that the index spindle be either laterally moved in or out in relation to the fixed position of the punch and die as with the above mentioned machine. Therefore, the linear distance from the point that the blank is picked up to the centerline of the index spindle changes and thus requires a change to the distance of the stroke of the linear servo mechanism that feeds the blank to the index spindle. The ejecting mechanism must also be adjusted to accommodate laminations of a different sizes. Furthermore, the ejecting mechanism provides no means of locating the lamination in a precise manner and provides no precise location of the finished lamination therefore such a machine does not stack laminations to form a pre-assembled core as is desirable for high efficiency production processes.

U.S. Pat. No. 4,331,049 discloses yet another automatic notching press which numerically controls a notching press arrangement which includes a multi-armed feed and removing device having a turnstile or turn table which is selectively indexed or rotated so as to convey blanks to various processing systems. The stack unloading station and the rotor stacking station form the first and last processing station and are linked by a conveying device which operates independently of the turntable of the feeding and removing device.

The notch press adjusts for different sized blanks by keeping the index spindle stationary and moving the notching head radially with respect to the blank. The multi-ams are adjustable to transport blanks having different diameters.

However, the transport of the blanks to and from the notching station is facilitated by arms fixed to the turn table so that the arms arcuately move simultaneously to pick up and remove the blank from the pre-process stack and remove the lamination from the notching station. Consequently, such a machine requires the simultaneous pick-up and transfer of blanks between stations and the rate of transport of the blanks between stations is a function of the speed at which the turn table rotates. This rate may be slower than the rate at which the notching machine may notch a blank. Furthermore, the arcuate travel of the arms causes the blanks or laminations to be transported further than may be necessary, thereby slowing down maximum production rates.

Such a system also generally has an expansive size so as to occupy a significant amount of factory floor space and uses a significant amount of complex hardware to achieve the production operation. Therefore, such a system is typically too expensive and bulky for lower volume producers or high volume producers with a wide range of product variations.

To overcome the above problems and for other reasons, there exists a need for a high speed, minimally adjustable notching system which reduces changeover/set-up time and reduces the complexity of conventional lamination producing systems, to accommodate blanks of varying sizes or diameters.

SUMMARY OF THE INVENTION

An object of the present invention is to provide a high speed, low cost apparatus for producing motor laminations which reduces the change-over/set up time of conventional notching systems to efficiently produce motor laminations from blanks having varying diameters.

A further object of the invention is to provide a method of producing motor laminations from blanks which reduces the change-over/set up time of conventional notching systems to efficiently produce laminations from blanks having varying diameters.

A further object of the invention is to provide a high speed, low cost apparatus for producing motor laminations having a linear transport mechanism with a fixed stroke for transporting a blank from a stack to a notching station.

Another object of the invention is to provide an apparatus and method for improving blank and lamination throughput by facilitating independent movement of a blank transport assembly and a lamination removal mechanism so that a blank and lamination may occupy a same lateral point in parallel planes.

Yet another object of the invention is to provide an apparatus for producing motor laminations which includes a lamination removal mechanism having a fixed stroke, which removes the notched lamination from the notching station and places the lamination in a stack forming a pre-assembled core.

The present invention includes a blank carrier for securing the blanks about the blank location aperture, such as a mandrel over which the blanks are stacked, from which a linear transporting mechanism, such as a servo-controlled linear assembly slides along a pair of rails, for transporting a blank from the carrier to a notching station.

The linear transport mechanism moves a fixed stroke distance to facilitate transport of the blank to the notching station irrespective of the blank diameter. The notching station includes a blank locating mechanism, such as a retractable rotating index spindle, for centering the blank about the location aperture. The notching station also includes an adjustable punch for producing notches in the blank to form the notched motor lamination. The locating mechanism remains laterally fixed regardless of a change in blank diameter.

The apparatus also includes a lamination removal mechanism, operatively coupled to the linear transport mechanism, for removing the notched lamination from the notching station and placing the notched lamination on another carrier which also secures the notched lamination about the location aperture. The lamination removal mechanism also moves a fixed stroke distance irrespective of the blank diameter.

The linear transport mechanism and the lamination removal mechanism transport a blank or lamination from a stack or index spindle at independent times to provide improved part throughput. Different blank diameters may by used and accommodated by adjusting blank grippers, a lamination gripper, and the punch location.

The apparatus uses electronic control devices for coordinating transport of blanks, notching of blanks, and removal of laminations after notching is complete. The servo-controlled linear transport mechanism determines the location of the gripper assembly to insure proper blank handling. Sensing devices determine whether an in-process stack is empty, whether a lamination is currently being notched, and a position of the lamination removal mechanism.

A method is disclosed which includes securing the blanks about the location aperture on the blank carrier, linearly transporting the blank from the blank carrier to the notching station wherein linearly transporting includes linearly moving a blank transport mechanism a fixed stroke distance to facilitate transport of the blank to the notching station irrespective of the blank diameter.

The method further includes locating the location aperture of the blank in the notching station about a laterally fixed locating device wherein the notching station includes an adjustable punch device for producing said notch in the blank to form the notched motor lamination, removing the notched lamination from the notching station by a removing mechanism operatively coupled to the linear transport mechanism, and placing the notched lamination about the location aperture, by the removing mechanism, on a drop off carrier.

DESCRIPTION OF THE PREFERRED EMBODIMENTS

For purposes of simplicity, the following description will discuss the invention as producing laminations from circular blanks having a location aperture in their center and a plurality of ventilation apertures at various points through the remaining blank area. However, it will be apparent to those skilled in the art that any suitably shaped blank with a location aperture may be used, such as non-circular blanks or blanks with location apertures in non-center positions.

Figure 1:
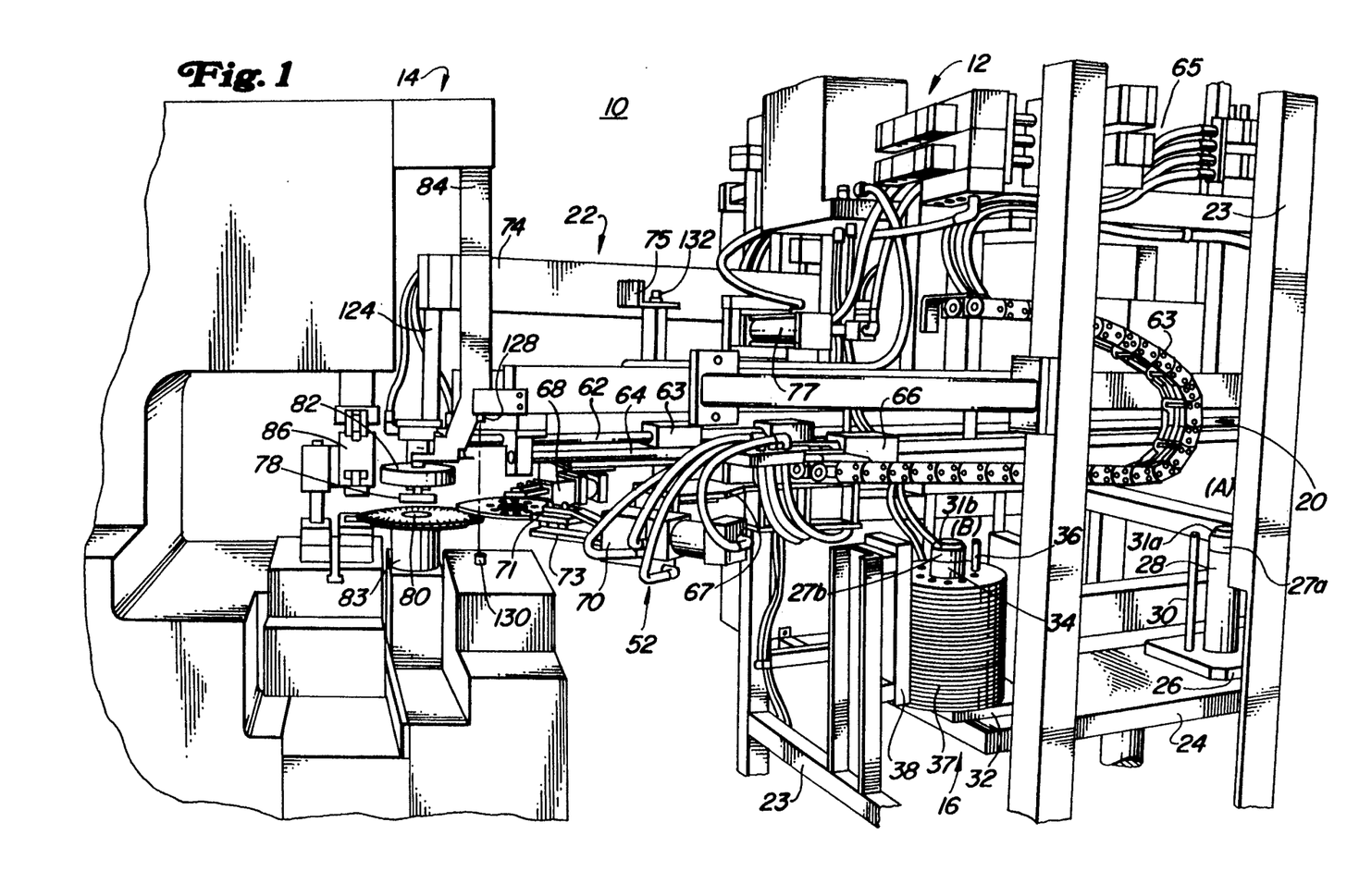
FIG. 1 is a perspective view of one embodiment of a lamination producing system in accordance with the invention.
Figure 2:
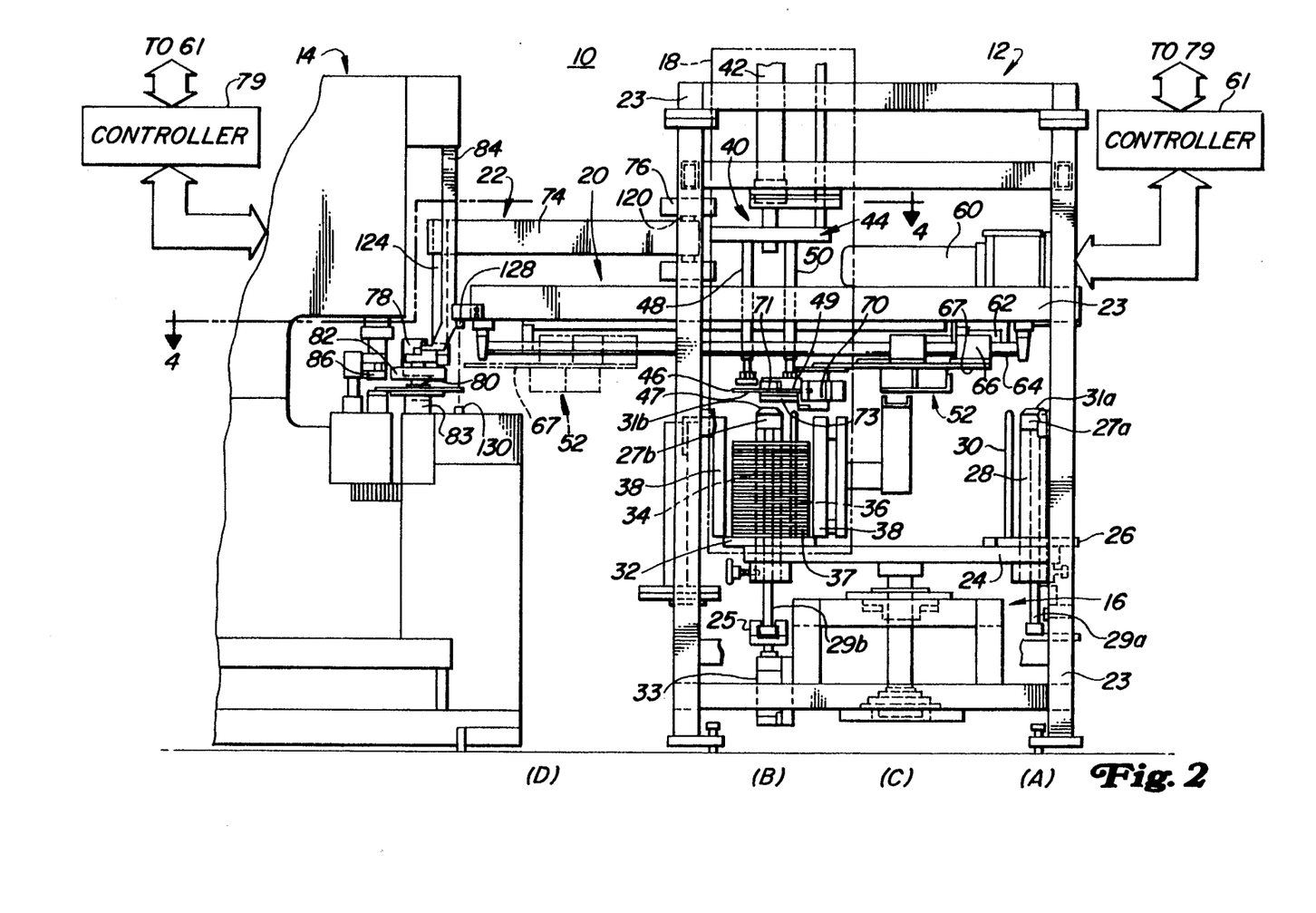
FIG. 2 is a right-side view of the lamination producing system of FIG. 1.

FIGS. 1 and 2 illustrate the preferred embodiment of the motor lamination producing apparatus 10 which includes a blank handling station 12 in linear alignment with a notching station 14. The blank handling station 12 includes a blank transfer section 16, a de-stacking section 18, a linear transport mechanism 20, and a lamination removal mechanism 22, all suitably supported by a frame structure 23.

Figure 3A:
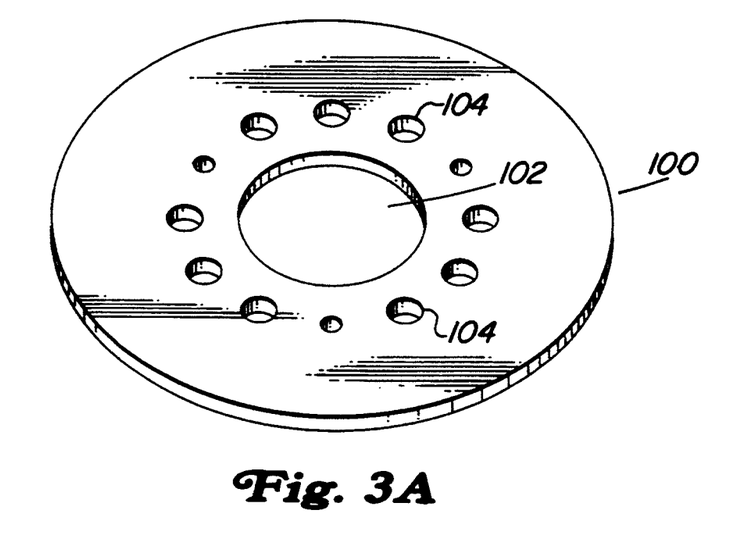
FIG. 3a is a perspective view of a blank prior to being notched.

The blank transfer section 16 includes a rotatable transport table 24 for transferring a stack of blanks from a pre-process position (A) to an in-process position (B). The blank transfer section 16 includes a pre-process blank carrier 26 having a mandrel 28 and locating rod 30 for aligning and holding a stack of blanks such as a stack formed from circular blanks 100 as depicted in FIG. 3a. The spacing between the outer circumferential surface of the mandrel and the inner diameter of the blank location aperture may be a few thousandths of an inch to minimize friction during loading and unloading of the blanks from the mandrel.

As shown in FIGS. 1 and 2, the pre-process blank carrier 26 is in the pre-load position (A). An in-process carrier 32, is located in the in-process position (B), 180° from the pre-process carrier 26. As with the pre-process carrier 26, the in-process carrier 32 includes a stacking mandrel 34, and a locating rod 36 for aligning and securing the blanks 37 in a position suitable for de-stacking.

Referring to FIG. 2, each of the mandrels 28 and 34 has a circular cross-section and includes an annular longitudinally reciprocatable head portion 27a and 27b, coupled to a drive shaft 29a and 29b which passes through a center channel of the mandrels. The head portion 27a and 27b is adapted to locatably slide through the location aperture in the blank. A top perimeter surface of each mandrel head 27a and 27b has a conically sloping lead portion 31a and 31b. Each drive shaft 29a and 29b has a base portion distal the mandrel head. A pneumatically driven air cylinder 33 couples with the base portion through a keyed block portion 25 when the mandrels are in the in-process position (B) so that the mandrel head may be slidably extended through the location aperture after the top blank is vertically lifted as will be described later. The blank handling system 12 may include a blank handling system such as PEC model LAM-48-90 available from and manufactured by Press Equipment Corp., Toledo, Ohio, or any other suitable apparatus whose features perform as required by the invention.

The de-stacking station 18 includes the in-process carrier 32, a pair of opposing fanning magnets 38 for vertically separating the blanks as known in the art, and a magnetic pick-up assembly 40. The pair of fanning magnets 38 are affixed to a suitable frame member of the frame 23. Magnetic pick-up assembly 40 includes an air cylinder 42 coupled to a support assembly 44 which supports pick-up magnets 46. The pick-up magnets 46 are coupled to the support assembly 44 through posts 48 and 50. Pick-up magnets 46 are located at distal ends of posts 48 and 50 proximate a top of the in-process stack of blanks 37.

The pick-up assembly 40 includes empty stack detectors 47 and 49, such as non-contact proximity switches as known in the art, at the distal ends of each poet 48 and 50 proximate the pick-up magnets 46. When no blanks are present, or when a blank falls off the pick-up magnets 46, the detectors 47 and 49 will produce a measurement different from a predetermined value thereby indicating to the controller 61 that the in-process stack is empty or that a blank has not been picked up.

Dual detectors 47 and 49 are used so that if a detector is inadvertently positioned over a ventilation aperture 104 not being used as a location aperture for locating rods 30 and 36, the other detector will indicate that a blank has been picked up. However, where blanks do not have additional apertures, a second detector may not be necessary.

The linear transport mechanism 20 includes a servo-motor 60 for driving a ball screw for controlling a linearly movable gripper assembly 52 which moves laterally along the length of a pair of rails 62 and 64, such as a pair of Thomson rails. The linear transport mechanism 20 includes containment rack 63 for securing air lines 65 used for blank grippers 68 and 70, and a support plate 67 coupled to a plurality of slidable pillow blocks 63 and 66. The gripper assembly 52 is supported on pillow blocks 63 and 66, as known in the art. The servo-motor 60 receives its control signals from a controller 61 such as a General Electric series PLC 90/30, a microprocessor, or other suitable control device, located in a control panel (not shown). The gripper assembly 52 includes pneumatically actuated blank grippers 68 and 70. The blank grippers 68 and 70 each include a fixed magnetic top bar 71 and movable bottom finger 73. Although two blank grippers are used, it may be suitable to use a single gripper having a suitably arranged grip area depending upon the size and thickness of blanks to be transported.

The lamination removal mechanism 22 includes a lamination unloading arm 74 pivotally attached a frame portion 76 of the frame 23. The unloading arm 74 includes a pneumatically actuated unload gripper 78 attached to a distal end of the unloading arm 74 opposite its pivotal end. The unloading arm 74 is arcuately movable by a pneumatically activated piston and cylinder 77. A removal arm stop member 75 prevents the removal arm 74 from pivoting too far inward toward the linear path traveled by the gripping assembly 52.

The unload gripper 78 includes a slidably adjustable shaft 79 secured by clamp 81 to the distal end of the pivot arm 74. The unload gripper 78 also includes an upper finger and a lower finger which grip a peripheral outer upper and peripheral outer lower surface of the lamination.

Figure 4:
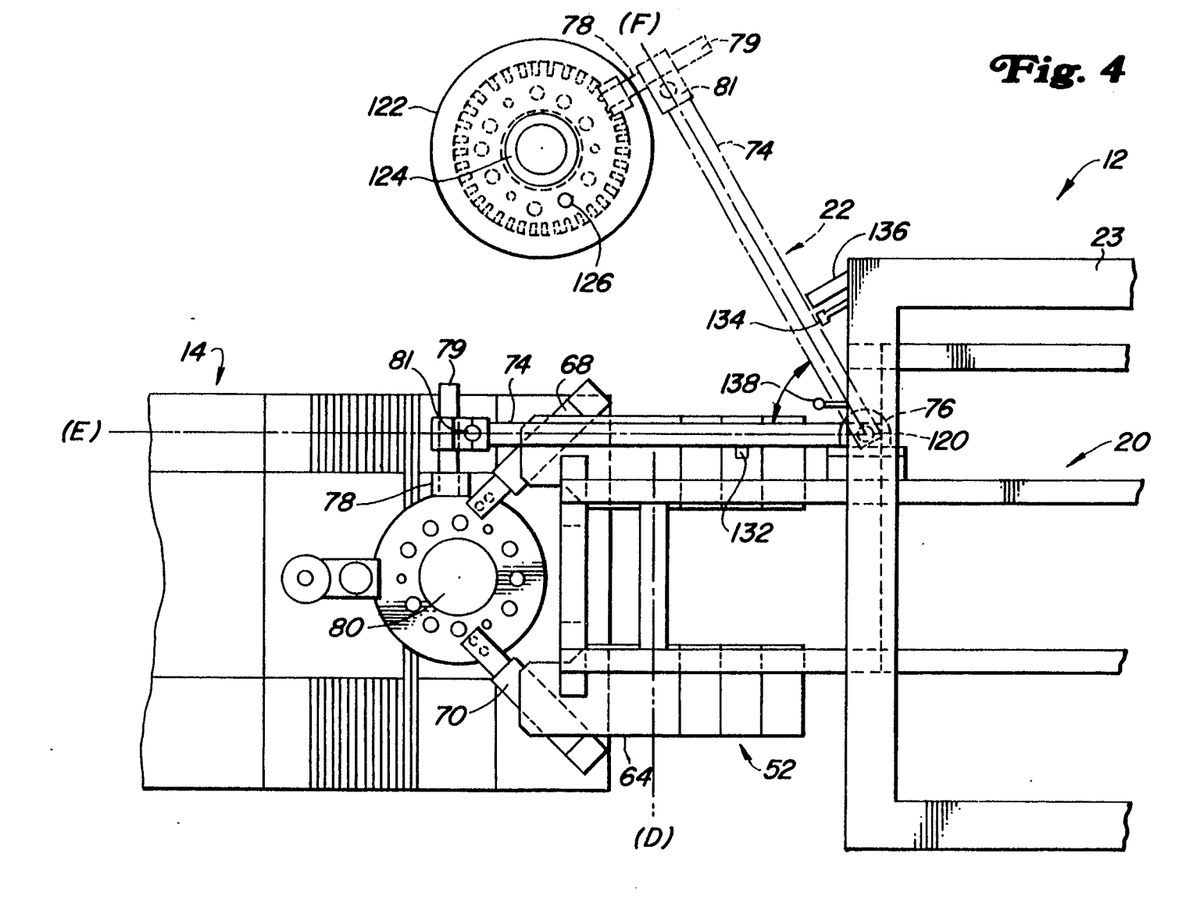
FIG. 4 is a plan view taken along line 4—4 generally depicting the linear transport mechanism in its pre-programmed position and the lamination removal mechanism in accordance with the invention.

As seen in FIG. 4, the position of the unloading arm 74 is determined by the controller 61 through home proximity sensor 132, unload proximity sensor 134 and lamination clear sensor 138. Home proximity sensor 132 is adjacent the stop member 75 and indicates when the removal arm 74 is in the home position (E). Unload proximity sensor is located adjacent stop member 136 and indicates when the removal arm is in the unload position (F). Lamination clear sensor 138 determines when a lamination is clear of the index spindle so that the clamp plate 82 may clamp the next blank.

Notching section 14 includes a notch press such as a Schuler notch press, Model No. N8, available from Schuler GmbH in Germany, which includes a press controller 79, a laterally stationary, longitudinally retractable rotatable index spindle 80, longitudinally fixed blank support plate 83 and a radially movable notching head 86 which is radially adjustable with respect to a rotational axis of the blank to be notched. The index spindle 80 receives the location aperture 102 (seen in FIG. 3a) of the blank such that the blank is rotatable about a longitudinal rotational axis of the spindle 80. A clamping plate 82 attached to a support member 84, strips the blank from the magnetic top bars 71 and secures the blank about the retractable index spindle 80 so that the blank may be stepwise rotated 360° by the index spindle 80 during notching, as known in the art. The retractable index spindle 80 remains in a spatially fixed lateral position and the notching head 86 is radially movable with respect to the blank to adjust for varying diameters of blanks.

The press controller 79, such as a Siemens Model No. 103, activates the notching head 86 and rotatable spindle 80 to notch the blank in predetermined positions as known in the art. The press controller 79 also communicates with the controller 61 of the blank handling system 12 to indicate when the notching process is completed, as will be described later. Although separate controllers 61 and 79 are shown, it will be recognized that a single computer or controller may be used to control the notch station 12, transport mechanism 20, and lamination removal mechanism 22. The apparatus 10 also includes a reflective optical sensor 128 and a reflector 130 positioned to determine whether a lamination 106 is in the notching station 14. It will be recognized that any suitable detecting device may also be used such as a photo-emitter and opposing photo-detector.

FIG. 3a shows a circular blank 100 having a substantially circular aperture 102 in its center and a plurality of ventilation holes 104. As will be recognized by those skilled in the art, the blank has a grain and thickness. The thickness may vary across the diameter of the blank such that stacking the blanks without varying the orientation so as to offset thickness variations may result in poor core stacking. For purposes of simplicity, it will be assumed that the pre-process stacks have been orientated to minimize the effects of blank thickness variation. The circular aperture 102 and a selected ventilation aperture 105 serve as location apertures although the circular aperture 102 may be the only location aperture where the blanks do not include ventilation apertures.

Figure 3B:
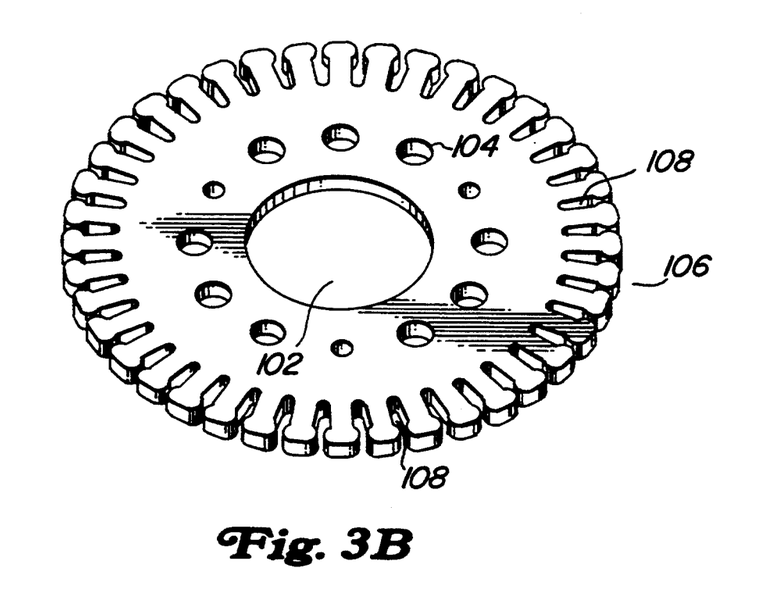
FIG. 3b is a perspective view of a lamination made from the blank of FIG. 3a using the lamination producing system of FIGS. 1 and 2.

FIG. 3b shows a lamination 106 formed from the circular blank 100 after being notched by the notching station 14. The finished lamination 106 includes a plurality of notches 108 about its periphery as shown.

FIG. 4 shows the removal arm 74 pivotal about rod 120 which is fixedly attached to the frame 23 of the blank handling station 12. The removal arm 74 moves a fixed stroke distance arcuately from the notching station 14 to the post-notching carrier 122. The post-notching carrier includes a center mandrel 124 and locating rod 126 similar to the pre-process carrier 26 and in-process carrier 32.

The removal arm 74 couples to the blank handling station 12 such that the linear path of the blank gripper assembly 52 is not obstructed. The grip support shaft 124 (best seen in FIG. 1) extends vertically downward from the distal end of the removal arm 74 such that the lamination unload gripper 78 lies below and adjacent the rails 62 and 64 and below the blank grippers 68 and 70. This allows the blank grippers 68 and 70 to position a blank in one horizontal plane while the lamination unload gripper 78 may hold a lamination in a lower parallel horizontal plane.

In operation, an operator stacks circular blanks, such as those shown in FIG. 3a, onto the pre-process carrier 26 to form a pre-process stack in pre-process position (A). The stacking mandrels 28 and 34 and location rods 30 and 36 for each carrier 26 and 32 respectively, serve to secure the blanks about the location apertures. In accordance with the invention, the operator may stack the blanks onto the pre-process carrier 26 while the de-stacking station 20 and linear transport station 22 transport blanks from the in-process position on carrier 32 to the notching station 14. The inventive lamination producing system 10 thereby facilitates a continuous feed of blanks into the lamination notching process. It will be recognized that a conveyor, or other suitable loading mechanism could also be used to stack or load a pre-stacked carrier into the pre-process position (A) instead of an operator.

Where the pre-process stack is the first stack of a production run to be processed, the rotatable table 24 rotates 180° to put the now loaded pre-process carrier into the in-process stack position (B). Where the lamination producing apparatus 10 has been operating and a previous in-process stack from the in-process carrier 32 has been emptied, the rotatable table 24 rotates 180° in a similar manner to put the fully loaded pre-process stack into the in-process stack position (B). Consequently, the emptied carrier 26 lies in the pre-process position (A) where it may be filled with blanks by the operator. When the pre-process carrier 26 and the in-process carrier 32 are in their proper positions, the center axis of both carriers 26 and 32 and the index spindle 80 are in linear alignment coincident with the linear transport mechanism.

Once the full stack of blanks is in the in-process position (B), the controller 61 for the handling station activates the de-stacking station 20 such that the pick-up magnets 46 vertically remove the top most blank from the in-process stack. The gripper assembly 52 lies in a retracted position (C), best seen in FIG. 2, so that the blank grippers 68 and 70 may grab the top most blank from the pick-up assembly 40. The mandrel head 27b is slidably located into the blank. The blank grippers 68 and 70 are actuated by the controller 61 to grab the periphery of the vertically raised blank such that the magnetic top bar 71 couples to a top outer surface of the blank while the bottom finger 73 couples to a bottom outer surface of the blank. The mandrel head 27a is slidably retracted to its rest position.

The linear transport section 20, linearly transports the blank from the in-process carrier 32 to the notching section 14. The servo controlled linear transport mechanism 20 moves gripper assembly 52 along the rails 62 and 64 to a predetermined position such as a pre-programmed position (D), best seen in FIG. 2 or 4, which aligns the location aperture 102 with the retractable spindle 80 as best seen in FIG. 4. The linear transport mechanism 22 moves a fixed stroke distance defined by the distance traveled by the gripper assembly 52 from the retracted position (C) to the pre-programmed position (D). Consequently, the linear transport mechanism 22 transfers the blank laterally from the in-process stack to the retractable spindle 80 in the notching station 44.

The blank grippers 68 and 70 place the location aperture 102 over the index spindle thereby locating the location aperture of the blank in the notching station. The index spindle 80 extends upwardly and the clamp plate 82 extends downwardly to push the location aperture over the index spindle 80. The notching station 14 proceeds to put notches in the periphery of the blank, as known in the art. When the notching process is completed, the press controller 79 retracts the spindle 80 such that the notched lamination may be removed.

At the suitable time, the controller 61 activates the pneumatically driven pivot arm 74 to move from its home position (E), as best seen in FIG. 4, to its lamination drop off position (F). The removal mechanism 22 removes the notched lamination 106 from the notching section by using the lamination gripper 78 to grab the periphery of the notched lamination. The lamination gripper 78 grabs the lamination 106 at a different location from the blank grippers 68 and 70.

Once the lamination 106 is secured by the lamination gripper 78, the controller 61 moves the pivot arm 74 to the predetermined drop off position (F). At the drop off position (F), the lamination gripper 78 places the lamination 106 onto the post-process carrier 112. The pivot arm 74 moves a constant stroke distance during each removal operation. The stroke distance is defined as the distance between the home position (D) and the drop-off position (F). Since the laminations 106 are complete and maintained in the same orientation from pre-process to post-process, the post-process stack could be used as pre-assembled cores and may then be transferred to a final assembly process.

Figure 5A:
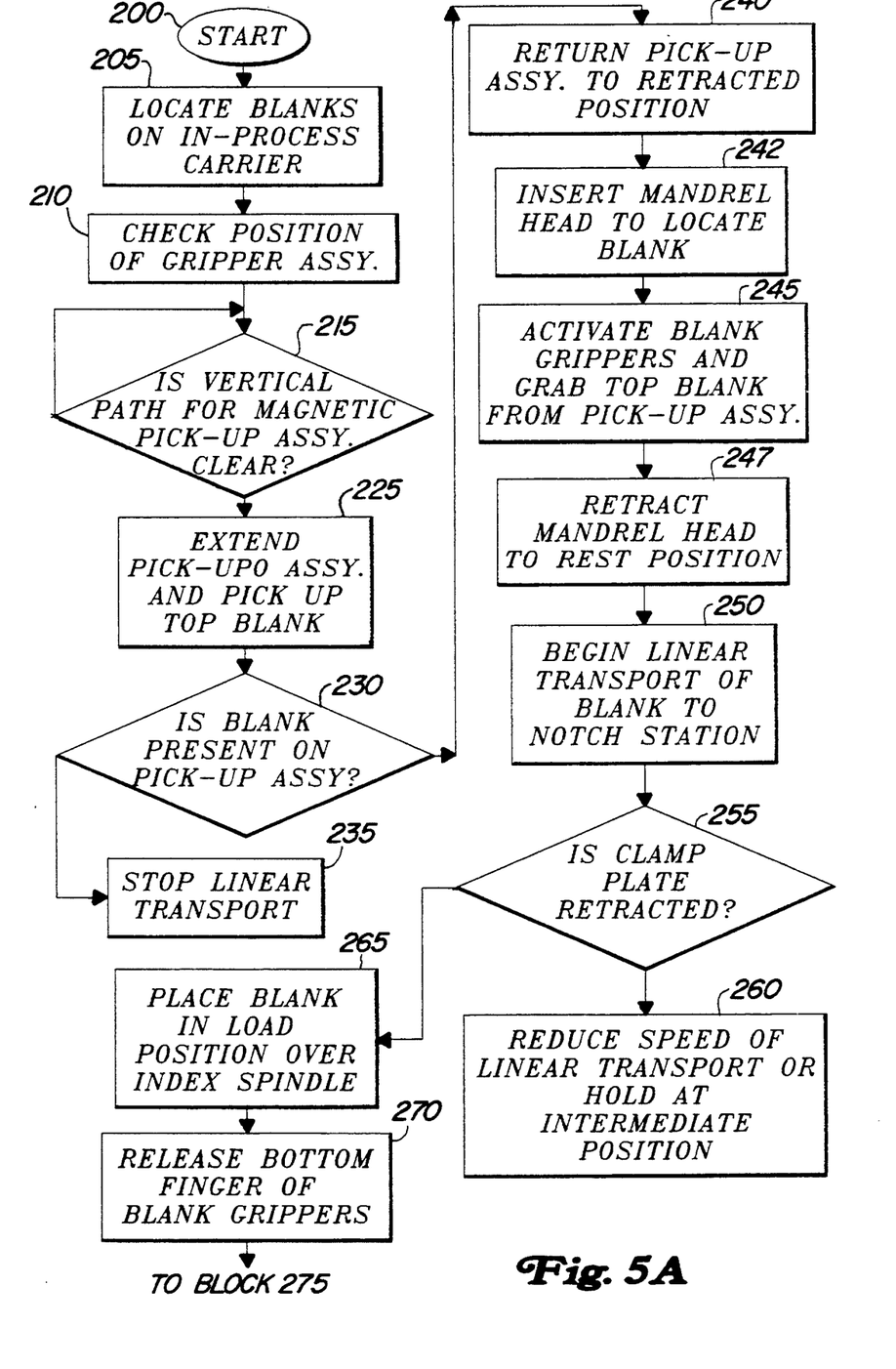
FIGS. 5a, 5b and 5c generally depict a flow chart of a method of producing laminations in accordance with the invention.
Figure 5B:
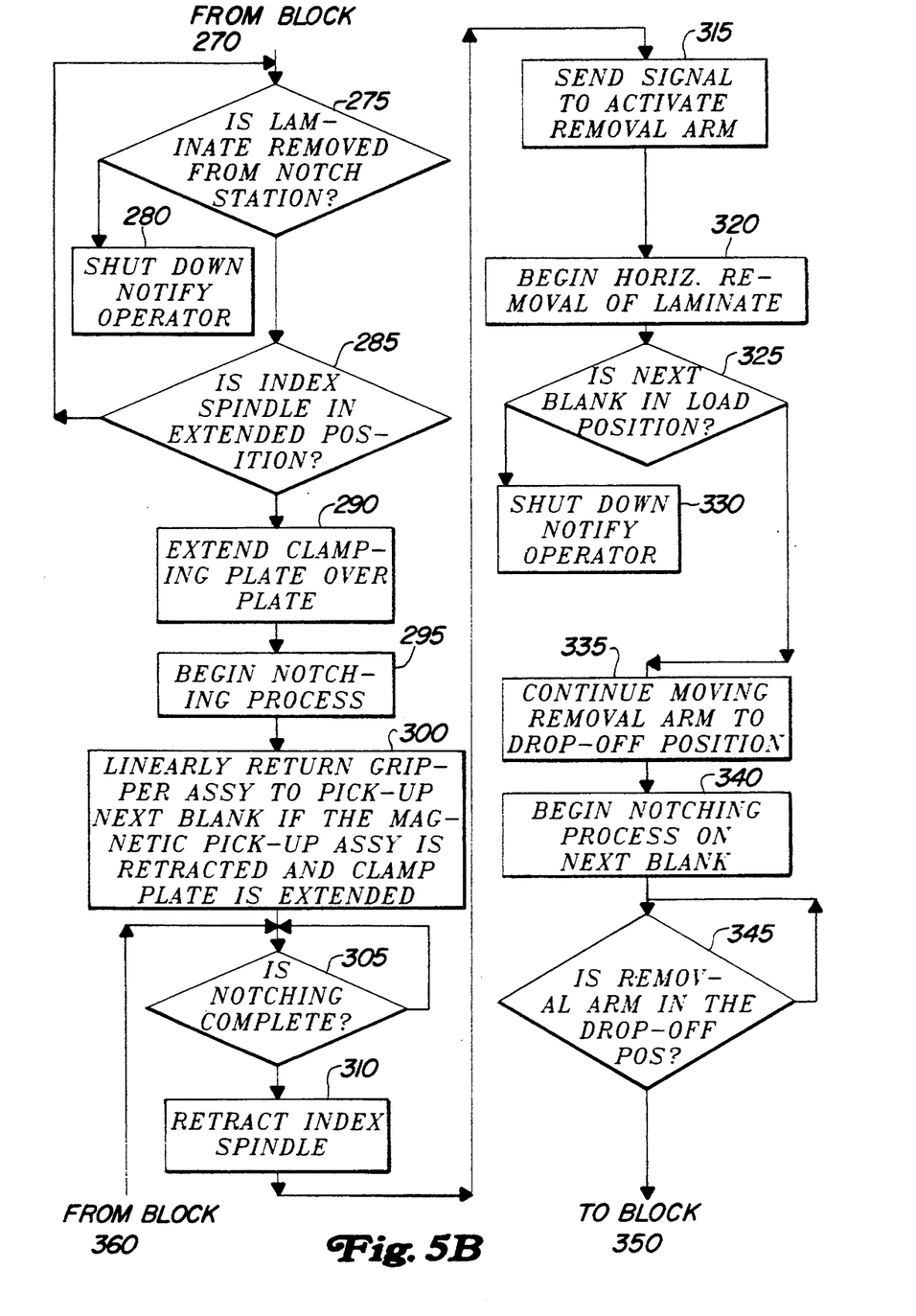
Figure 5C:
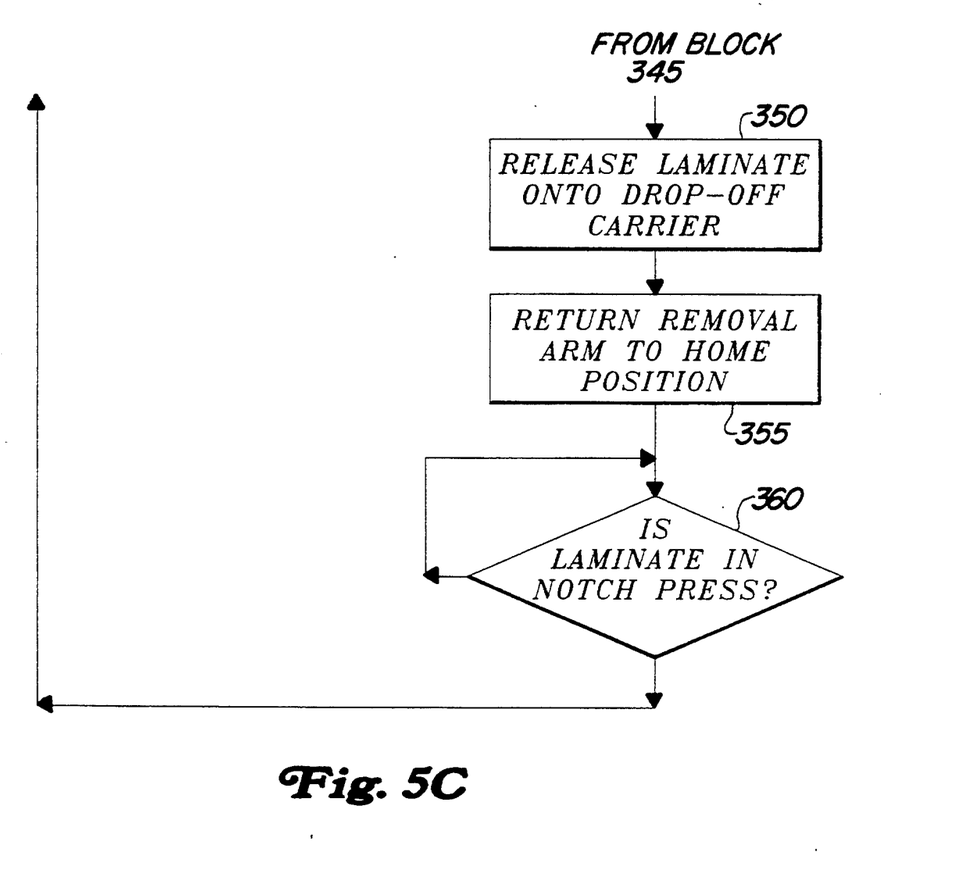

FIGS. 5a, 5b and 5c illustrate more specifically the preferred method of blank and lamination transport and communication between the blank handling station 12 and the notching station 14. In block 200, an operator manually loads the pre-process mandrel 28 with an appropriate number of blanks to be formed into laminations. The rotating table 24 then locates the blanks in the in-process carrier position (B) as indicated in block 205. In block 210, the handling controller 61 determines the position of the gripper assembly 52 based on information from a servo controller (not shown) which knows the exact position of the gripper assembly 52 along the rails. The servo controller is able to detect a current overload which may be indicative of a mechanical interference. Once the position of the gripper assembly 52 is known, the controller 61 determines whether the vertical path for the magnetic pick-up assembly 40 is clear, as indicated in block 215. If the vertical path for the magnetic pick-up assembly is not clear, the controller 61 waits until the path is clear. When the vertical path of the magnetic pick-up assembly is clear, the controller 61 actuates the cylinder 42 to extend the pick-up assembly 40 to pick up the top blank from the in-process stack at position (B), as indicated in block 225.

In block 230, the controller 61 determines whether the pick-up assembly 40 has in fact coupled to a blank. This is determined by the position of the detectors 47 and 49 so that if either of these proximity switches do not indicate the presence of a blank, controller 61 will know that no blank has been picked up or that a blank has dropped off the magnets 46, or that the in-process stack at position (B) is empty. When no blank is detected, the linear transport mechanism 20 is stopped as indicated by block 235. Any blank currently in the notching station is then completely notched and removed by the removal arm 74. When the controller 61 determines that a blank has been properly picked up, the cylinder 42 is actuated to retract the pick-up assembly as indicated in block 240. In block 242, the controller 61 actuates the air cylinder 33 to move the mandrel head 27a or 27b up through the locating aperture of the blank to properly locate the blank since movement may occur during or after the pick-up magnets have coupled to the top blank.

Once the blank has been properly located, the controller 61 activates the blank grippers 68 and 70 to grab the blank from the pick-up magnets 46, as shown in block 245. In block 247, the controller 61 actuates the air cylinder 33 to retract the mandrel head 27a or 27b to its rest position. Next, in block 250, the controller 61 actuates the servo motor 60 to begin linear transport of the gripper assembly 52 to transport the blank to notch station 14.

The controller 61 communicates with the press controller 79 to determine whether the clamp plate 82 is retracted as indicated in step 255. When the clamp plate is not retracted, the controller 61 will reduce the speed of the gripper assembly 52 or hold the gripper assembly 52 in an intermediate position as indicated in block 260. When the clamp plate retracted, the gripper assembly 52 places the blank in the load position over the index spindle 80 as indicated in block 265. In block 270, the controller 61 releases the bottom fingers of the blank grippers 68 and 70 thereby leaving the blank coupled to top magnet bars 71 of the grippers 68 and 70 as previously discussed.

The controller 61 in block 275, determines whether the lamination 106 has been removed from the notch station by receiving a signal from the optical emitter and reflective detector 128. When the lamination has not been removed, as shown in block 280, the apparatus 10 shuts down and an operator is notified.

When the lamination is removed from the notch station 14, the controller 61 in block 285, determines whether the index spindle 80 is in its extended position by receiving a signal from the press controller 79. If the index spindle 80 is not in its extended position, the controller 61 then returns back to the decision in block 275 to determine whether the lamination has been removed. When the index spindle 80 is in its extended position, the press controller 79 extends a clamping plate 82 over the blank as indicated in block 290. In block 295, the notching process begins.

In block 300, the controller 61 linearly returns the gripper assembly 52 to pick up the next blank if the magnetic pick-up assembly 40 is retracted and if clamp plate 82 is extended. In step 305, the controller 61 waits for a signal from the press controller 79 indicating that notching has been completed. When the notching has been completed, the controller 79 retracts the index spindle as shown by block 310.

Next, in block 315, the controller 79 sends a signal to controller 61 which activates the removal arm 74. In block 320, the removal arm grabs the lamination and begins horizontal removal of the lamination 106. The controller 61 through input from the servo controller whether the next blank is in the load position as indicated in block 325. When the next blank is not in the load position, the clamp plate will not reach its proper position whereafter the notch press retracts the clamp plate and initiates a shut down of the system 10, and as indicated by block 330. If the next blank is in the proper load position, the controller 61 continues to move the removal arm 74 to the drop-off position as indicated in block 335.

In block 340, the notch press begins notching the next blank. In block 345, the controller 61 determines whether the removal arm 74 is in its drop position and will continue moving the arm until it determines that the removal arm 74 is in the proper drop-off position. In block 350, when the removal arm is in its drop-off position, the lamination unload gripper 78 releases the lamination 106 onto the drop-off carrier 122. In block 355, the controller 61 returns the removal arm 74 to its home position (E). Next, in block 360, the controller 61 determines through the reflective optic sensor 128, whether a lamination is present in the notch press. If a lamination is present, the lamination production process continues such that the next blank is de-stacked and linearly transported to the notching station whereafter the notching process continues. The notching process continues as indicated until the in-process stack is emptied or the pick-up assembly has improperly picked up a blank.

From the above, it is evident that the next blank can be moved into the load position regardless of whether or not the finished lamination has been removed, since the lamination and blank are positioned or removed from the notch station from different horizontal planes. Furthermore, the blank may be moved into the load position, regardless of whether the spindle is up or down since the blank and lamination being notched again are on different horizontal planes. Also, the use of the servo mechanism allows the controller 61 and press controller 79 to know where the blank is at all times during linear movement.

Consequently, both a blank to be notched and a lamination 106 may occupy parallel planes in the notch station 14 so that complete removal of the lamination from the notch station is not necessary before a blank may be transported to the notch station 14.

For example, as the notching station 14 is applying notches to a blank 100, the linear transport mechanism 22 may retract back to the in-process stack and pick up another blank while the notching process is being completed. The linear transport mechanism 22 may then transport the next blank up to the notching station 24 where after the index spindle 80 may be retracted and the linear transport mechanism 22 may then move a blank in position above the index spindle 80 while the unloading arm 74 is grabbing the lamination 106 underneath the blank and removing it so that, in effect, a finished lamination 106 and a unnotched blank 100 occupy a same lateral point in parallel planes above the index spindle 80.

When laminations from a different diameter blank are to be produced in the lamination producing apparatus 10, an operator merely adjusts the blank grippers by unscrewing a tightening screw and sliding the lamination gripper in a linear manner. The operator also adjusts the lamination gripper by sliding the slidable shaft 79 in a linear manner so that the gripper 78 grips the appropriate portion of the lamination. The notch head 86 may be adjusted by turning a ball screw (not shown) to move the entire notch head assembly in a lateral direction with respect to the index spindle 80. It will be recognized that where cost effective, the grippers may be coupled to an automatic adjusting mechanism such as by a pneumatically driven shaft or other suitable adjustment means.

Since alignment of the blank throughout the lamination process is based upon a fixed location aperture 102 (and/or 104) which is located about a plurality of laterally fixed axes, stroke distances of the transport mechanism 20 and the removing mechanism 22 never need to be adjusted. The center line of each blank securing mechanism throughout the lamination process, such as the carriers 26 and 32, the index spindle 80 and the post-process carrier 122 maintain the blank or lamination in the same laterally fixed positions irrespective of the diameter of the blank. Variation in blank diameter is accommodated by adjusting only the radially adjustable punch head, the blank grippers, and the lamination gripper. The elimination of the adjustment of the stroke distances substantially reduces changeover/set-up times since the grippers may be quickly adjusted.

Furthermore, the linear movement provides a straight path from the in-process carrier to the notching section 14 which is shorter than conventional arcuate paths used by many blank notching systems. This helps reduce transport time between stations and significantly simplifies the mechanical linkages normally associated with notching systems which utilizes rotary turn tables for transporting blanks to fixed location coordinates throughout the notching process. In addition, the above disclosed apparatus reduces the complexity and physical size of conventional handling sections which conserves factory floor space and reduces costs since multiple orientation stations and turn table coordination features are unnecessary.

A further advantage results from the independent movement of the linear transport mechanism 20 and the lamination removal mechanism 22. Since transport of a blank and removal of a lamination need not occur simultaneously, greater part throughput can be achieved compared to many known lamination production machines. The inventive apparatus and methods allow the system to begin transportation of a blank to the notching station prior to the notching operation being completed, and prior to the notched lamination being removed from the notching station.

As disclosed, the index spindle of the notching press is fixed which thus maintains a fixed linear distance from the point that the part is picked up from, to the centerline of the spindle. Also, the unload mechanism picks the blank from the spindle and places it on a mandrel for precise fixed slot alignment. Consequently, the aforedescribed invention yields a minimal setup operation while still maintaining high machine product flexibility as is desirous for producers of custom motor laminations which must produce many low volume production lots from a variety of diameter blanks.

Specific embodiments of novel apparatus and methods for producing motor laminations from blanks has been described for purposes of illustrating the manner in which the invention may be used and made. It should be understood that the implementation of other variations and modifications of the invention in its various aspects will to apparent to those skilled in the art, and that the invention is not limited by the specific embodiments described. It is therefore contemplated to cover by the present invention any and all modifications, variations, or equivalents that fall with the true spirit and scope of the basic underlying principles disclosed and claimed herein.

What is claimed is:

1. An apparatus for producing notched laminations from a blank having a location aperture, the apparatus comprising:

first carrier means for securing the blanks about the location aperture;

means for linearly transporting the blank from the first carrier means to a notching means wherein the linear transport means moves a fixed stroke distance to facilitate transport of the blank to the notching means irrespective of the blank diameter the notching means including means for locating the blank about the location aperture and punch means for producing the notched lamination, wherein the locating means remains laterally fixed and the punch means is adjustable to accommodate a plurality of blank diameters; and means, operatively connected to the linear transport means, for removing the notched lamination from the notching means and for placing the notched lamination on a second carrier means.

2. The apparatus of claim 1 wherein the linear transport means begins to transport the blank to be notched to the notching means prior to removal of a previously notched lamination by the removing means.

3. The apparatus of claim 1 further comprising:
   means for controlling the notching means wherein the removing means moves in response to a signal from the controlling means.

4. The apparatus of claim 1 wherein the linear transport means includes a linearly movable gripper means controlled by servo control means.

5. The apparatus of claim 4 wherein the linearly movable grip means further comprises:
   adjustable blank grip means for griping blanks having varying diameters.

6. The apparatus of claim 1 wherein the removing means moves a fixed stroke distance to facilitate removal of the lamination irrespective of the lamination diameter.

7. The apparatus of claim 6 wherein the removal means further comprises:
   adjustable lamination grip means for gripping laminations of varying diameters.

8. The apparatus of claim 1 wherein the removal means further comprises:
   a pivotal arm coupled proximate the linear transport means such that the pivotal arm does not intersect a linear path travelled by the linear transport means.

9. The apparatus of claim 1 wherein the adjustable punch means for producing the notch further comprises:
a radially adjustable press head wherein the press head is movable to facilitate changes in the diameter of the blank.

10. The apparatus of claim 1 wherein the locating means is a longitudinally retractable index spindle.

11. The apparatus of claim 1 wherein the first carrier means further comprises:
means for locating the blank about its location aperture after being secured by the linear transport means but prior to being transported by the linear transport means.

12. The apparatus of claim 11 wherein the locating means comprises:
an annular reciprocatable head position adopted to locatably slide through the location aperture in response to a signal from a control means.

13. The apparatus of claim 11 wherein the first carrier means further comprises:
a location rod for receiving a second location aperture.

14. The apparatus of claim 1 wherein the second carrier means further comprises:
a mandrel for receiving the location aperture and a location rod for receiving a second location aperture.

15. The apparatus of claim 14 wherein the removal means stock serves as a pre-assembled motor core which subsequently passes to a final assembly station.

16. The apparatus of claim 1 wherein the linear transport means commences transport of the blank to the notching means prior to placing the lamination on the second carrier means.

17. A method for producing notched laminations from a blank having a location aperture, the method comprising the steps of:
securing at least one blank about the location aperture on a first carrier means;
linearly transporting at least one blank from the first carrier means to a notching means wherein linearly transporting includes linearly moving a transport means a fixed stroke distance to facilitate transport of the blank to the notching means irrespective of the blank diameter;
positioning the location aperture of the blank in the notching means about a laterally fixed locating means, the notching means including a punch means for producing the notched lamination, wherein the locating means remains laterally fixed and the punch means is adjustable to accommodate a plurality of blank diameters;
removing the notched lamination from the notching means by a removing means operatively connected to the linear transport means; and
placing the notched lamination, by the removing means, on second carrier means.

18. The method of claim 17 wherein removing the notched lamination comprises:
moving the removing means a fixed stroke distance to facilitate removal of the lamination irrespective of the lamination diameter.

19. The method of claim 18 wherein the removal means further comprises:
adjustable lamination grip means for gripping laminations of varying diameters.

20. The method of claim 17 wherein removing the notched lamination further comprises:
moving a pivotal arm coupled proximate the linear transport means such that the pivotal arm does not intersect a linear path travelled by the linear transport means.

21. The method of claim 17 wherein the movable means for producing the notch further comprises:
a radially adjustable press head wherein the press head is movable to facilitate changes in the diameter of the blank.

22. The method of claim 17 wherein removing the notched lamination further comprises the step of:
retracting the locating means.

23. The method of claim 17 further comprising the step of:
locating the blank about its location aperture after being secured by the linear transport means but prior to being transported by the linear transport means wherein locating the blank includes locatably sliding an annular reciprocatable head portion of the first carrier means through the location aperture in response to a signal from a control means.

24. The method of claim 23 wherein the first carrier means further comprises:
a location rod for receiving a second location aperture.

25. The method of claim 17 wherein the second carrier means further comprises:
a mandrel for receiving the location aperture and a location rod for receiving a second location aperture such that the step of placing the notched lamination further comprises:
stacking the lamination on the second carrier means such that a resultant stack serves as a pre-assembled motor core which subsequently passes to a final assembly station.

26. The method of claim 17 wherein linearly transporting the blank to the notching means commences prior to placing the lamination on the second carrier means.

27. The method of claim 17 wherein linearly transporting the blank begins prior to removing the notched lamination from the notching means.

28. The method of claim 17 further comprising the step of:
controlling the removing means in response to a signal from a notch control means.

29. The method of claim 17 wherein the step of linearly transporting comprises the step of:
moving a linearly movable grip means using a servo control means wherein the linearly movable grip means comprises:
adjustable blank grip means for gripping blanks of varying diameters.

30. An apparatus for transporting a blank, having a location aperture, to a notching station and for transporting a notched blank from the notching station, the apparatus comprising:
means for linearly transporting the blank a fixed stroke distance irrespective of blank diameter from a stack of blanks to the notching station wherein the notching station notches the blank to form a lamination;
means, operatively connected to the linear transport means, for removing the lamination from the notching station to a lamination carrier means in response to a predetermined event, wherein the linear transport means begins to transport the blank to be notched to the notching station prior to the removing means moving a previously notched lamination; and means for locating the blank about its location aperture after being secured by the linear transport means but prior to being transported by said linear transport means, the locating means comprising an annular reciprocatable head portion adapted to locatably slide through the location aperture in response to a signal from a control means.

31. The apparatus of claim 30 wherein the removing means moves a fixed stroke distance to facilitate removal of the lamination irrespective of the lamination diameter.

32. The apparatus of claim 31 wherein said removal means further comprises adjustable lamination grip means for gripping laminations of varying diameters.

33. The apparatus of claim 30 wherein the removal means further comprises:

a pivotal arm coupled proximate the linear transport means such that the pivotal arm does not intersect a linear path travelled by the linear transport means.

34. The apparatus of claim 30 wherein the transport means positions the blank relatively above the linear transport means to facilitate simultaneous movement of the transport means and removing means.

35. The apparatus of claim 30 wherein the predetermined event is the completion of the notching of the blank.

36. The apparatus of claim 30 wherein the linear transport means includes a linearly movable grip means controlled by servo control means wherein the linear movable grip means moves a fixed stroke distance to facilitate transport of the blank to the notching means irrespective of the blank diameter.

37. The apparatus of claim 36 wherein said linear transport means includes adjustable blank grip means for gripping blanks of varying diameters.

* * * * *

UNITED STATES PATENT AND TRADEMARK OFFICE
CERTIFICATE OF CORRECTION

PATENT NO. : 5,333,525

DATED : June 5, 1992

INVENTOR(S) : MARK DONALD SCHLEGEL, ET AL

It is certified that error appears in the above-identified patent and that said Letters Patent is hereby corrected as shown below:

On the face sheet, the inventorship should be shown as follows:

Mark D. Schlegel, Erie, Pa.
Austin J. Crisp, Sylvania, Oh.
Paul A. Pessa, Erie, Pa.

Signed and Sealed this

Twenty-fifth Day of October, 1994

*Attest:*

BRUCE LEHMAN

*Attesting Officer*     *Commissioner of Patents and Trademarks*

UNITED STATES PATENT AND TRADEMARK OFFICE
CERTIFICATE OF CORRECTION

PATENT NO. : 5,333,525
DATED : August 2, 1994
INVENTOR(S) : Mark Donald Schlegal, et. al.

It is certified that error appears in the above-indentified patent and that said Letters Patent is hereby corrected as shown below:

Title page, item [75] Inventors: should read as follows:

MARK D. SCHLEGEL, ERIE, PA
AUSTIN J. CRISP, SYLVANIA, OH
PAUL A. PESSA, ERIE, PA

This certificate supersedes Certificate of Correction issued October 25, 1994.

Signed and Sealed this

First Day of August, 1995

Attest:

BRUCE LEHMAN

*Attesting Officer*       *Commissioner of Patents and Trademarks*